(12) United States Patent
Asanuma et al.

(10) Patent No.: US 8,358,721 B2
(45) Date of Patent: Jan. 22, 2013

(54) MOBILE COMMUNICATION SYSTEM AND WIRELESS DEVICE

(75) Inventors: Yutaka Asanuma, Tokyo (JP); Shigeo Terabe, Kawasaki (JP)

(73) Assignee: Fujitsu Toshiba Mobile Communications Limited, Kawasaki (JP)

(*) Notice: Subject to any disclaimer, the term of this patent is extended or adjusted under 35 U.S.C. 154(b) by 514 days.

(21) Appl. No.: 12/417,029

(22) Filed: Apr. 2, 2009

(65) Prior Publication Data

US 2009/0190680 A1 Jul. 30, 2009

Related U.S. Application Data

(63) Continuation of application No. PCT/JP2007/068867, filed on Sep. 27, 2007.

(30) Foreign Application Priority Data

Oct. 10, 2006 (JP) ................................ 2006-276610

(51) Int. Cl.
*H04L 27/00* (2006.01)
(52) U.S. Cl. .................... 375/324; 375/260; 375/295
(58) Field of Classification Search .............. 375/259, 375/260, 267, 295, 316, 324, 340
See application file for complete search history.

(56) References Cited

U.S. PATENT DOCUMENTS

| 2003/0016622 A1* | 1/2003 | McCarty, Jr. ............ 370/207 |
| 2005/0117630 A1* | 6/2005 | Kishi ...................... 375/147 |
| 2005/0157639 A1* | 7/2005 | Song et al. ............... 370/208 |
| 2006/0115014 A1* | 6/2006 | Jeong et al. .............. 375/267 |
| 2006/0270416 A1* | 11/2006 | Perets et al. ............ 455/452.2 |
| 2007/0025473 A1* | 2/2007 | Aizawa et al. ........... 375/324 |

FOREIGN PATENT DOCUMENTS

| JP | 2002-526982 A | 8/2002 |
| JP | 2004-236040 A | 8/2004 |
| JP | 2005-123898 A | 5/2005 |

OTHER PUBLICATIONS

"Multiplexing including reference-signal structure," 3GPP TR 25.814 V1.0.1 (Nov. 2005), 3 pages.
International Preliminary Report on Patentability and Written Opinion of the International Searching Authority dated Apr. 30, 2009 (7 pages), issued in counterpart International application No. PCT/JP2007/068867.
3GPP TSG-RAN WF1 LTE Ad Hoc Meeting Helsinki, Finland Jan. 2006; R1060032; L1/L2 Control Channel Structure for E-Utra Downlink; pp. 1-9.
N. Miki et al; Structure and Channel Coding Schemes for Layer 1/Layer 2 Control Channel in OFDM Based Evolved Utra Downlink; IEEE Technical Report; pp. 49-54, Aug. 2006.
3GPP TSG RAN WG1 #46; Tallinn, Estonia, Aug.-Sep. 2006; L1/L2 Control Channel Structure With CDM Based Multiplexing in E-Ultra Downlink; pp. 1-7.

* cited by examiner

*Primary Examiner* — David B Lugo
(74) *Attorney, Agent, or Firm* — Maschoff Gilmore & Israelsen

(57) ABSTRACT

A base station transmits a control channel transmitted before information channels upon performing differential coding between control channels of adjacent frequencies. A terminal apparatus performs transmission path estimation on the basis of a pilot while decoding the control channel having undergone the differential coding. The information channels are decoded on the basis of information obtained by decoding the control channel and a transmission path estimation result on the pilot.

3 Claims, 4 Drawing Sheets

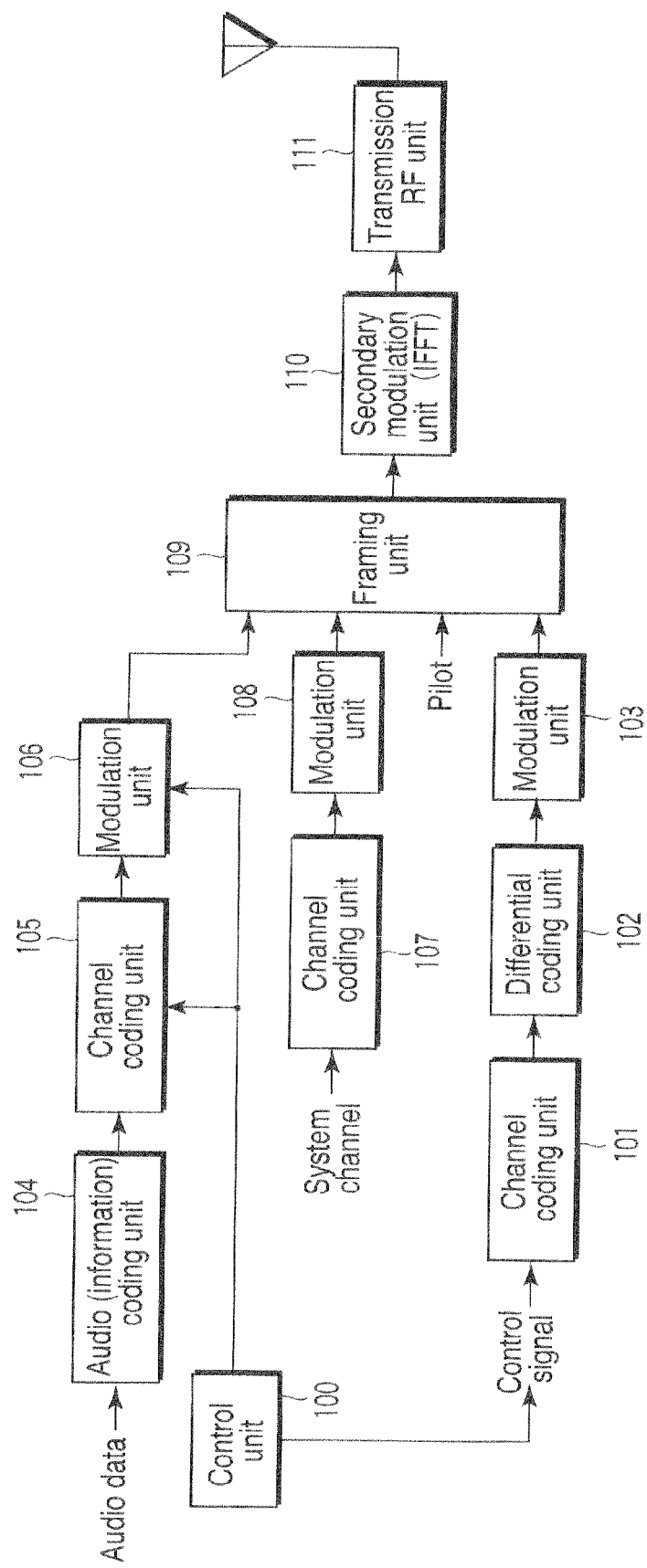
F I G. 3

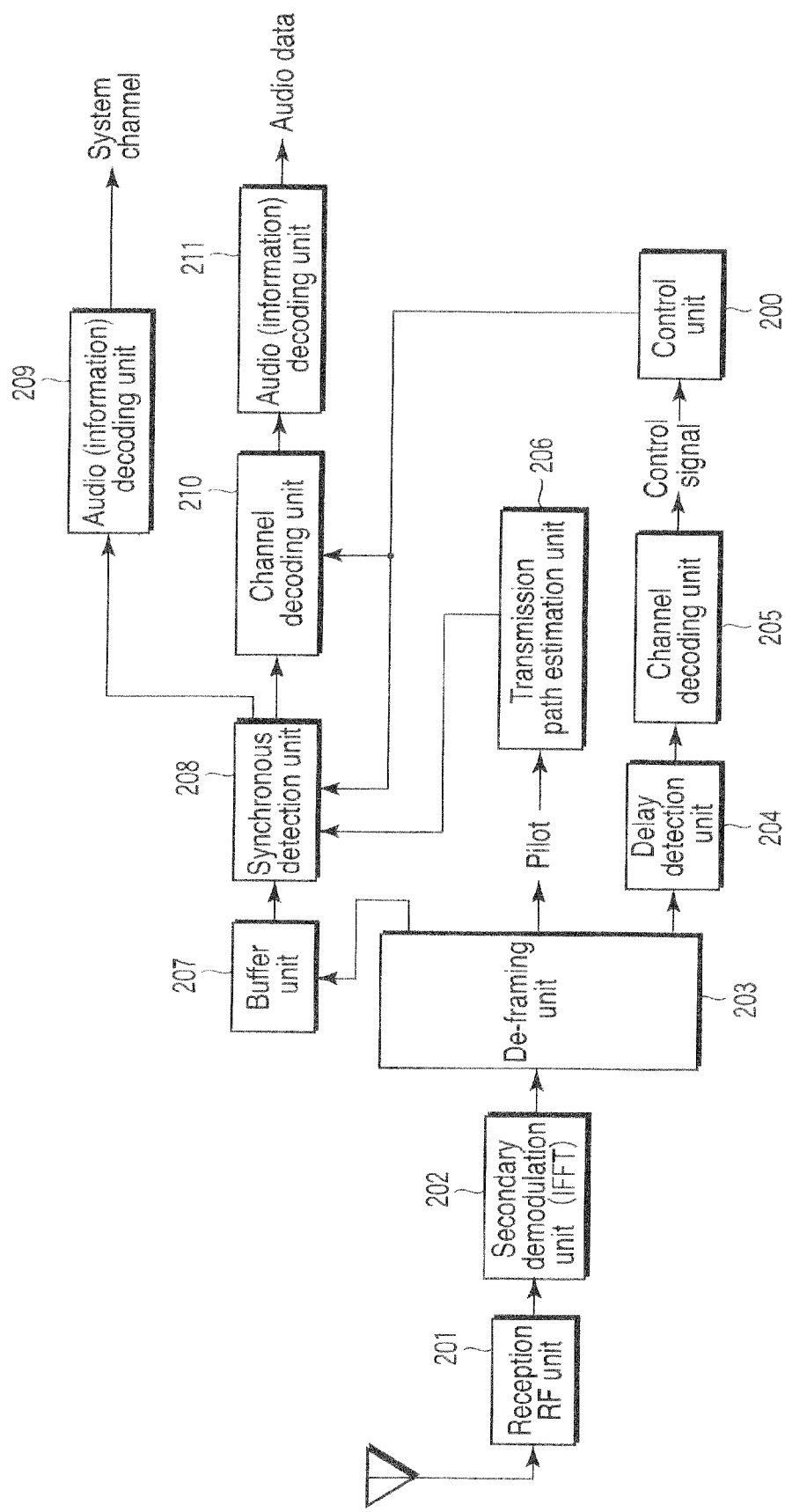
F I G. 4

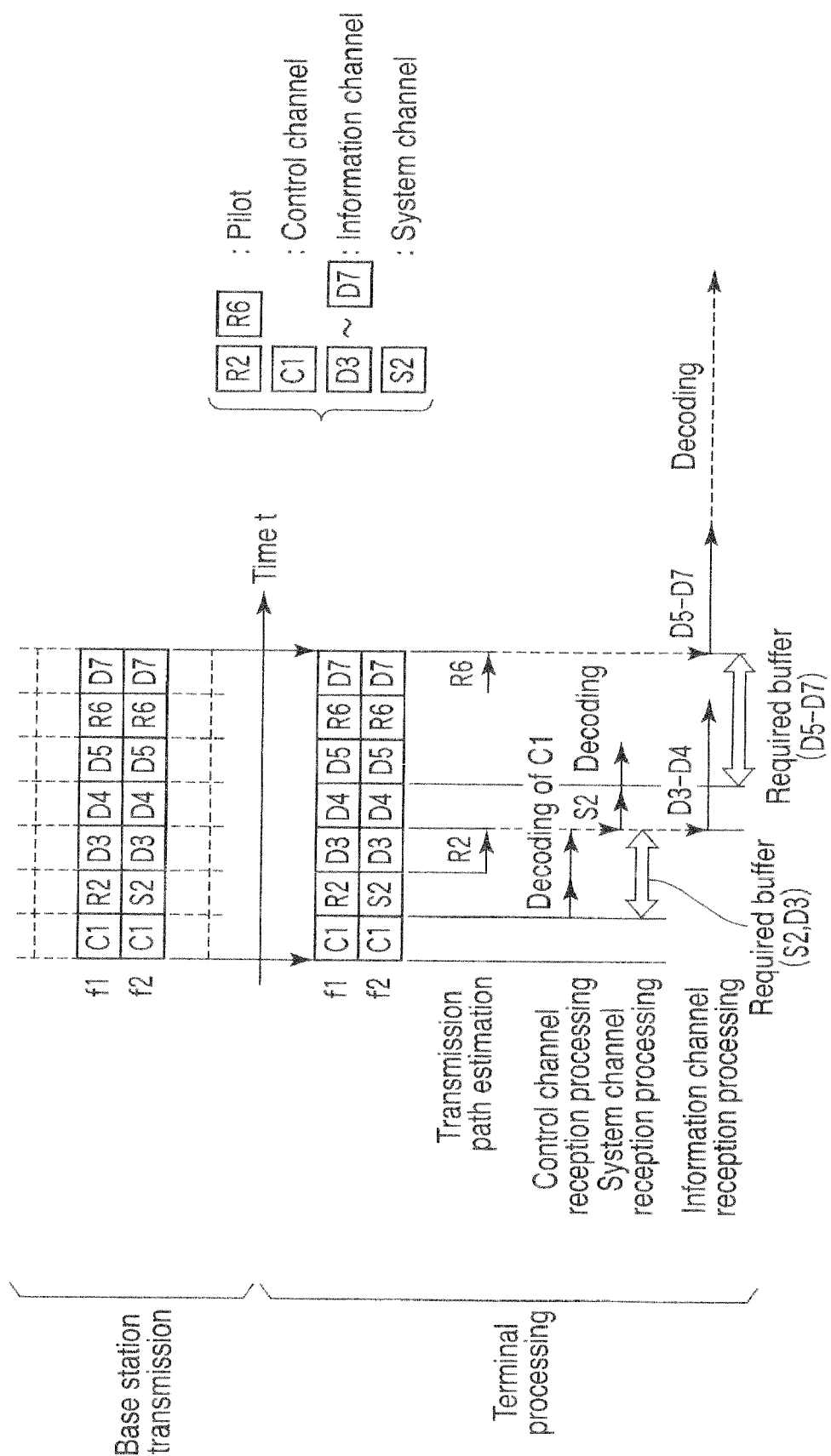
F I G. 5

MOBILE COMMUNICATION SYSTEM AND WIRELESS DEVICE

CROSS-REFERENCE TO RELATED APPLICATIONS

This is a Continuation Application of PCT Application No. PCT/JP2007/066867, filed Sep. 27, 2007, which was published under PCT Article 21(2) in Japanese.

This application is based upon and claims the benefit of priority from prior Japanese Patent Application No. 2006-276610, filed Oct. 10, 2006, the entire contents of which are incorporated herein by reference.

BACKGROUND OF THE INVENTION

1. Field of the Invention

The present invention relates to a mobile communication system which performs multicarrier communication by using a reference signal.

2. Description of the Related Art

As is generally known, adaptive modulation and coding (AMC) is a technique for improving a transmission rate and reception quality by executing modulation and coding in accordance with transmission path quality. Several arrangements have been proposed to implement AMC. The following arrangement is an example.

The receiving side measures wireless transmission path quality, and determines a transmission format (a combination of modulation and a coding ratio) which allows signal reception on the basis of the measured value. The receiving side then transmits the resultant data as a channel quality indication (CQI) to the transmitting side. The transmitting side selects a transmission format on the basis of the CQI and transmits transmission information on an information channel. This information is transmitted assuming that the type of transmission format of the information channel is a control channel.

That is, on the receiving side, the transmission format of an information channel can be known via the control channel, and the transmission information is received (see, for example, 3GPP TR 25.814 V1.0.1 (2005-11)). According to 3GPP TR 25.814 V1.0.1 (2005-11), the transmitting side is a base station, the receiving side is a terminal, the control channel is HS-SCCH, and the information channel is HS-PDSCH. HS-SCCH is transmitted before corresponding HS-PDSCH. The terminal receives HS-SCCH and obtains transmission format information necessary for the reception of HS-PDSCH. This system uses code division multiplexing (CDM), and hence multiplexes HS-SCCH and HS-PDSCH by changing codes.

In a multicarrier wireless communication system designed to form frames by division in the time direction and the frequency direction as in the orthogonal frequency division multiplexing (OFDM) scheme, it is difficult to insert a modulated information signal, a reference signal for synchronous detection, and a control signal representing the modulation coding information of the information signal at desired timings, respectively.

Conventionally, in order to accurately measure the wireless transmission path quality of each subcarrier on the receiving side, a reference signal is discretely inserted. A channel received before the reference signal is buffered, and transmission path estimation is performed by using the subsequently received reference signal. The buffered channel is then decoded on the basis of the estimation result. In addition, it is necessary to buffer a channel received during decoding. This Inevitably increases the buffer capacity.

BRIEF SUMMARY OF THE INVENTION

Conventionally, it is difficult to insert an information signal, a reference signal, and a control signal at desired timings, respectively. If the reference signal is inserted at a timing suitable for transmission path estimation, the capacity of the reception buffer increases.

The present invention has been made to solve the above problem, and has as its object to provide a mobile communication system and wireless device which can reduce the capacity of a reception buffer even if a reference signal is inserted at a timing suitable for transmission path estimation.

In order to achieve the above object, according to the present invention, a mobile communication system comprising a transmission apparatus and a reception apparatus, characterized in that: the transmission apparatus comprises first generation means for coding transmission information and generating a transmission signal by performing modulation using the coding result, second generation means for generating coding data including a plurality of control signals, each of the control signals including control information related to information indicating a method for demodulation corresponding to the modulation and a decoding method corresponding to the coding, third generation means for generating a known reference signal in the reception apparatus, and transmission means for performing wireless transmission of the control signals, the reference signal, and the transmission signal, and the reception apparatus comprises reception means for receiving a wireless signal transmitted by the transmission apparatus, first detection means for detecting the control information by performing delay detection of the control signals received by the reception means, estimation means for performing transmission path estimation on the basis of the reference signal received by the reception means, storage means for buffering the transmission signal, and second detection means for detecting the transmission information by demodulating and decoding a transmission signal stored in the storage means on the basis of the control information detected by the first detection means and the estimation result obtained by the estimation means.

BRIEF DESCRIPTION OF THE SEVERAL VIEWS OF THE DRAWING

FIG. 3 is a circuit block diagram showing the arrangement of a base station in the mobile communication system according to the present invention;

FIG. 4 is a circuit block diagram showing the arrangement of a terminal apparatus in the mobile communication system according to the present invention; and FIG. 5 is a view for explaining transmission processing by a base station and reception processing by a terminal apparatus in the mobile communication system according to the present invention.

DETAILED DESCRIPTION OF THE INVENTION

An embodiment of the present invention will be described below with reference to the accompanying drawings. The following will exemplify a cellular (cellular phone) system which uses orthogonal frequency division multiplexing (OFDM) as a modulation scheme on a downlink for transmission from a base station to a terminal apparatus.

Figure 1:
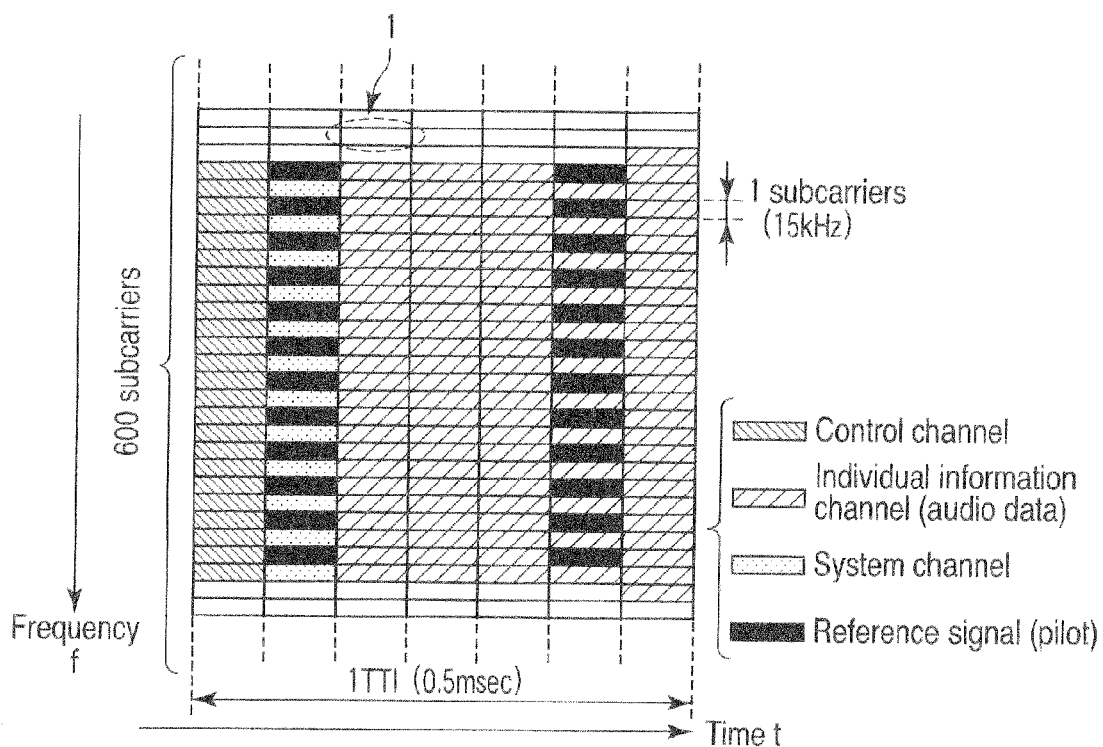
FIG. 1 is a view for explaining an example of the arrangement of a TTI based on the OFDM modulation scheme used in a mobile communication system according to the present invention.

The OFDM modulation scheme converts high-speed data signals into low-speed, narrowband data signals, and concurrently transmits the signals on the frequency axis by using a plurality of subcarriers. The OFDM modulation scheme described below use 600 subcarriers and a subcarrier interval of 15 kHz. One time frame (transmission time interval [TTI]) is 0.5 ms, and includes 7 OFDM symbols. FIG. 1 shows an example of the arrangement of a TTI.

As shown in FIG. 1, a TTI includes a known reference signal by which the terminal apparatus obtains a transmission path estimation value, an information channel on which information to be transmitted to the terminal apparatus is carried, a control channel on which information indicating the transmission format of the information channel is carried, and a system channel on which other pieces of system information are carried. A link from a base station to a terminal is formed for each TTI.

Figure 2:
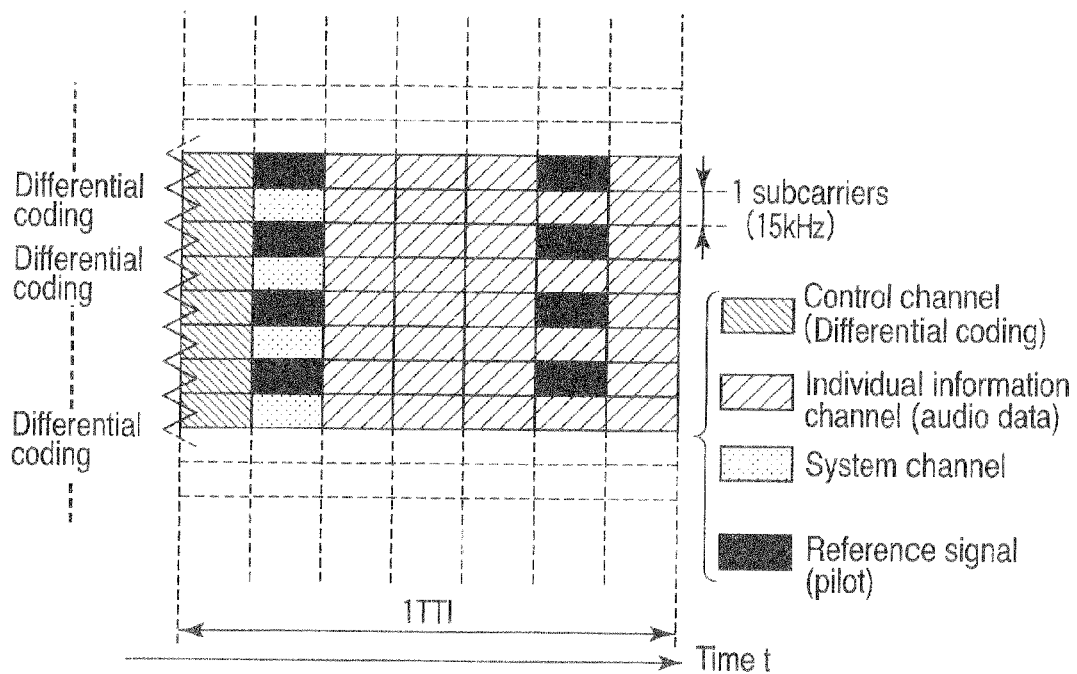
FIG. 2 is a view showing an example of the assignment of subcarriers used in the mobile communication system according to the present invention.

In the system according to the present invention, in order to allow demodulation of a control channel without using any transmission path estimation value obtained from a reference signal, the control channel is differentially coded to allow delay detection, as shown in FIG. 2. This differential coding is performed between the OFDM symbols of adjacent subcarriers.

The arrangement of a mobile communication system according to an embodiment of the present invention will be described next. FIG. 3 shows the arrangement of the transmission system of a base station. FIG. 4 shows the arrangement of the reception system of a terminal apparatus.

The arrangement of the transmission system of the base station will be described first with reference to FIG. 3. The base station assigns a plurality of subcarriers shown in FIG. 2 to a plurality of terminal apparatuses, and performs transmission via subcarriers. Each subcarrier is assigned with a control channel at the start timing of each TTI, a system channel or a known reference signal (pilot) on the terminal apparatus side, which follows the control channel, and an individual information channel such as audio data following them.

The transmission system of the base station includes a control unit 100, a channel coding unit 101, a differential coding unit 102, a modulation unit 103, an audio (information) coding unit 104, a channel coding unit 105, a modulation unit 106, a channel coding unit 107, a modulation unit 108, a framing unit 109, a secondary modulation (inverse fast Fourier transformation [IFFT]) unit 110, and a transmission RF unit 111.

The control unit 100 controls overall transmission/reception in the base station, and outputs a plurality of control signals to the channel coding unit 101 via control channels shown in FIG. 2. Each of these control signals contains control information (information indicating a channel coding rate, a modulation scheme, and the like) by which the control unit 100 receives a subcarrier transmitted at the same frequency as that of control channel to be transmitted.

The channel coding unit 101 channel-codes a bit string of each control signal at the channel coding rate agreed with the terminal apparatus in advance. The differential coding unit 102 differentially codes the coding results obtained by the channel coding unit 101 by using channels assigned to subcarriers adjacent to each other on the frequency axis, as shown in FIG. 2, so as to allow the terminal apparatus which has received the signal to perform delay detection. The modulation unit 103 performs multivalued modulation on the basis of the differential coding result obtained by the differential coding unit 102.

The audio (information) coding unit 104 codes audio data (reception by the terminal apparatus). The channel coding unit 105 channel-codes the bit string of the coding result obtained by the audio (information) coding unit 104 at the channel coding rate designated by the control unit 100. The channel coding rate used in this case matches the above control information.

The modulation unit 106 performs multivalued modulation based on the coding result obtained by the channel coding unit 105 by using the modulation scheme designated by the control unit 100. The modulation scheme used in this case matches the above control information.

The channel coding unit 107 channel-codes a bit string on the system channel at a channel coding rate agreed with the terminal apparatus side in advance. The modulation unit 106 performs multivalued modulation based on the coding result obtained by the channel coding unit 105 by using a modulation scheme agreed with the terminal apparatus side in advance.

The framing unit 109 performs frame assignment so as to assign an output (sound) from the modulation unit 106, an output (system channel) from the modulation unit 108, a pilot, and an output (control signal) from the modulation unit 103 to a subcarrier like that shown in FIG. 2, respectively.

The secondary modulation unit 110 performs inverse fast Fourier transformation to convert a frequency-domain signal output from the framing unit 109 into a time-domain signal. This signal is converted into a wireless (RF) signal by the transmission RF unit 111 including a digital-to-analog converter, an up-converter, and a power amplifier. This signal is radiated into air toward the terminal apparatus.

The arrangement of the reception system of the terminal apparatus will be described next with reference to FIG. 4. The terminal apparatus receives a chunk assigned by the base station. The reception system of the terminal apparatus includes a control unit 200, a reception RE unit 201, a secondary demodulation (fast Fourier transformation [FFT]) unit 202, a de-framing unit 203, a delay detection unit 204, a channel decoding unit 205, a transmission path estimation unit 206, a buffer unit 207, a synchronous detection unit 208, a channel decoding unit 209, a channel decoding unit 210, and an audio (information) decoding unit 211.

The reception RE unit 201 includes a down-converter and an analog-to-digital converter, and converts wireless signals transmitted from a plurality of terminal apparatuses into baseband digital signals. The secondary demodulation unit 202 performs fast Fourier transformation of the baseband digital signals to divide the time-domain signals into frequency-domain signals, i.e., signals for the respective subcarriers like those shown in FIG. 2.

The de-framing unit 203 separates the signal assigned to each subcarrier as shown in FIG. 2 into a pilot, a control signal, a system channel, and a signal on each channel of audio data in accordance with an instruction from the control unit 200. Note that the de-framing unit 203 outputs the pilot to the transmission path estimation unit 206; the signal on the channel corresponding to the control signal, to the delay detection unit 204; and the system channel and the signal on the channel corresponding to the audio data, to the buffer unit 207.

The delay detection unit 204 performs delay detection for the signal on the channel corresponding to the control signal. The channel decoding unit 205) channel-decodes an output from the delay detection unit 204 to obtain control signals on the respective control channels assigned to different frequencies like those shown in FIG. 2. The control unit 200 detects the multivalued modulation scheme performed by the terminal apparatus and the coding rate of channel coding for each frequency. Each multivalued modulation scheme detected in this case is notified to the synchronous detection unit 208. Each coding rate is notified to the channel decoding unit 209. When the above coding rate detection is complete, the control unit 200 notifies the synchronous detection unit 208 of the corresponding information.

The transmission path estimation unit 206 performs transmission path estimation for each frequency from the above pilot of each frequency.

The buffer unit 207 temporarily buffers the system channel and the signal on the channel corresponding to the audio data.

Upon receiving a notification indicating coding rate detection from the control unit 200 and the transmission estimation result obtained by the transmission path estimation unit 206, the synchronous detection unit 208 reads the system channel and the signal on the channel corresponding to the audio data from the buffer unit 207, and establishes synchronization on the basis of the transmission path estimation result on the frequency corresponding to each of these signals. The synchronous detection unit 208 then performs demodulation in accordance with the multivalued modulation scheme designated by the control unit 200.

Note that the demodulation of the system channel corresponds to the preset modulation scheme, and the demodulation of the audio data is based on the multivalued modulation scheme detected by the control unit 200 from the control signal. The synchronous detection unit 208 then outputs the demodulation result on the system channel to the channel decoding unit 209; and the demodulation result on the channel corresponding to the audio data, to the channel decoding unit 210.

The channel decoding unit 209 obtains a system channel by channel-decoding the demodulation result (corresponding to the system channel) obtained by the synchronous detection unit 208 at a coding rate agreed with the base station in advance.

The channel decoding unit 210 channel-decodes the demodulation result (corresponding to the audio data) obtained by the synchronous detection unit 208 at a coding rate notified from the control unit 200. The audio (information) decoding unit 211 obtains audio data by audio-decoding the channel decoding result obtained by the channel decoding unit 209.

The operation of the mobile commination system having the above arrangement will be described next.

First of all, the control unit 100 of the base station controls each unit to perform transmission upon assigning signals to subcarriers as shown in FIG. 5. That is, at a frequency f1, a control channel C1, a pilot R2, information channels D3, D4, and D5, a pilot R6, an information channel D7, . . . are transmitted in the order named. At a frequency f2, a control channel C1, a system channel S2, and information channels D3, D4, D5, D6, D7, . . . are transmitted in the order named.

The terminal apparatus performs reception in the following manner. That is, the terminal apparatus receives the control channel C1 via frequency f1. At the same timing, the terminal apparatus receives the control channel C1 via frequency f2. The control channels C1 corresponding to frequencies f1 and f2 have respectively undergone differential coding in the base station. Upon receiving the control channels C1, the delay detection unit 204 and the channel decoding unit 205 decode the control channels C1.

Concurrently with the above decoding operation, the terminal apparatus receives the pilot R2 via frequency f1, and receives the system channel S2 via frequency f2 at the same timing. Upon receiving the pilot R2, the transmission path estimation unit 206 performs transmission path estimation on the basis of the pilot. The buffer unit 207 buffers the system channel S2. Concurrently with the above transmission path estimation, the buffer unit 207 also buffers information channels D3 respectively received via frequencies f1 and f2.

When decoding of the control channel C1 by the delay detection unit 204 and the channel decoding unit 205 and transmission path estimation by the transmission path estimation unit 206 based on the pilot R2 are complete, the synchronous detection unit 208 reads the system channel S2 and information channel D3 from the buffer unit 207, and demodulates them by performing synchronous detection based on the decoding result on the control channel C1 and the transmission path estimation result.

The channel decoding unit 209 channel-decodes the demodulation result on the system channel. The channel decoding unit 210 channel-decodes the demodulation result on the channel corresponding to the audio data. The decoding unit 211 then decodes the resultant data. Note that while information channel D3 is decoded, received information channel D4 is buffered in the buffer unit 207. Information channel D4 is also decoded in the same manner, following information channel D3. With this operation, audio data corresponding to information channels D3 and D4 is obtained.

Concurrently with this decoding operation, at frequency f1, information channel D5, the pilot R6, and information channel D7 are received and buffered in the buffer unit 207. Similarly, at frequency f2, information channels DC to D7 are received and buffered in the buffer unit 207.

When the reception of the pilot R6 is complete, the transmission path estimation unit 206 performs transmission path estimation on the basis of the pilot R6. This transmission path estimation result is output to the synchronous detection unit 208. When the transmission path estimation result is input to the synchronous detection unit 208 again, the synchronous detection unit 208 reads information channels D5 to D7 from the buffer unit 207, and demodulates them by performing synchronous detection based on the decoding result on the control channel C1 and the result of the above transmission path estimation (R6).

When the decoding results on information channels D5 to D7 are obtained, the decoding unit 211 decodes them after they are channel-decoded by the channel decoding unit 210. With this operation, audio data corresponding to information channels D5 to D7 is obtained.

As described above, the mobile communication system having the above arrangement performs differential coding of the control channel C1 transmitted before information channels D3 to D7 between the control channels C1 of adjacent frequencies.

According to the mobile communication system having the above arrangement, therefore, even if the pilot R2 is inserted at a timing suitable for transmission path estimation, since the control channel C1 can be demodulated and decoded before the transmission path estimation result based on the pilot R2 is obtained, the required buffer capacity of the channel coding unit 107 which buffers information channels D3 to D7 and the like can be reduced.

Note that the present invention is not limited to the above embodiment, and constituent elements can be variously modified and embodied at the execution stage within the spirit and scope of the invention. In addition, various inventions can be formed by proper combinations of a plurality of constituent elements disclosed in the above embodiment. For example, several constituent elements may be omitted from all the constituent elements disclosed in the above embodiment. Furthermore, constituent elements in different embodiments may be properly combined.

What is claimed is:

1. A mobile communication system comprising a transmission apparatus and a reception apparatus, wherein:

the transmission apparatus comprises first generation means for coding transmission information and generating a transmission signal by performing modulation using the coding result, second generation means for generating coding data including a plurality of control signals, each of the control signals including control information related to information indicating a method for demodulation corresponding to the modulation and a decoding method corresponding to the coding, third generation means for generating a known reference signal in the reception apparatus, and transmission means for performing wireless transmission of the control signals, the reference signal, and the transmission signal in order of mention, and the reception apparatus comprises reception means for receiving a wireless signal transmitted by the transmission apparatus, first detection means for detecting the control information by performing delay detection of the control signals received by the reception means, channel decoding unit for performing differential decoding on the control signals received by the reception means according to the control information before transmission path estimation, estimation means for performing transmission path estimation on the basis of the reference signal received by the reception means, storage means for buffering the transmission signal, and second detection means for detecting the transmission information by demodulating and decoding a transmission signal stored in the storage means on the basis of the control information detected by the first detection means and the estimation result obtained by the estimation means, wherein the control signals have delay detection and decoding performed thereon before the transmission path estimation by the estimation means is completed, a required buffer capacity of the storage means is reduced.

2. A wireless device comprising:

first generation means for coding transmission information and generating a transmission signal by performing modulation by using the coding result;

second generation means for generating coding data including a plurality of control signals, each of the control signals including control information related to information indicating a method for demodulation corresponding to the modulation and a decoding method corresponding to the coding;

wherein differential decoding is performed on the control signals;

third generation means for generating a known reference signal on a receiving side, and transmission means for performing wireless transmission of the control signals, the reference signal and the transmission signal; and transmission means for performing wireless transmission of the control signals, the reference signal, and the transmission signal in order of mention, wherein the control signals have a delay detection process and a decoding performed thereon before a transmission path estimation is performed on the reference signal at a reception apparatus, so that a required buffer capacity for buffering the transmission signal is reduced at the reception apparatus.

3. A wireless device which performs wireless communication with a transmission apparatus that generates: a transmission signal based on transmission information; and coding data including a plurality of control signals, each of the control signals including control information related to information indicating a method for demodulation corresponding to the modulation and a decoding method corresponding to the coding, and that wirelessly transmits the control signals, a known reference signal and the transmission signal in order of mention, said wireless device comprising:

reception means for receiving a wireless signal transmitted by the transmission apparatus;

first detection means for detecting the control information by performing delay detection of the control signals received by the reception means, the control signals being differentially coded by using channels assigned to subcarriers adjacent to each other at the transmission apparatus before transmission path estimation, estimation means for performing the transmission path estimation on the basis of the reference signal received by the reception means, storage means for buffering the transmission signal, and second detection means for detecting the transmission information by demodulating and decoding a transmission signal stored in the storage means on the basis of the control information detected by the first detection means and the estimation result obtained by the estimation means.

* * * * *